United States Patent [19]

Nikkel et al.

[11] Patent Number: 4,646,663

[45] Date of Patent: Mar. 3, 1987

[54] FERTILIZER DISC ASSEMBLY FOR A PLANTER

[76] Inventors: Lee F. Nikkel, P.O. Box 117, Madrid, Nebr. 69150; Barry W. Baerg, R.R. 2; Randy Ensz, Rte. 2, both of Ogallala, Nebr. 69153; Ray E. Frank, Box 117A, Rte. 1, Madrid, Nebr. 69150

[21] Appl. No.: 743,666

[22] Filed: Jun. 11, 1985

[51] Int. Cl.⁴ ............................................. A01C 5/00
[52] U.S. Cl. ................................................... 111/73
[58] Field of Search ............... 111/6, 7, 87, 88, 85, 111/52, 73, 80, 86, 81; 172/602, 574, 29

[56] References Cited

U.S. PATENT DOCUMENTS

| | | | |
|---|---|---|---|
| 2,106,901 | 2/1938 | Rassmann | 111/88 |
| 2,920,587 | 1/1960 | Shriver | 111/88 |
| 2,981,213 | 4/1961 | O'Neil | 111/85 X |
| 3,060,873 | 10/1962 | Powers | 111/73 |
| 3,061,018 | 10/1962 | Olson | 172/602 |
| 3,115,192 | 12/1963 | Bushmeyer | 172/602 |
| 3,351,139 | 11/1967 | Schmitz | 172/602 |
| 3,373,705 | 3/1968 | Hansen et al. | 111/73 |
| 4,187,916 | 2/1980 | Harden et al. | 111/85 X |
| 4,214,537 | 7/1980 | Bailey | 111/87 |
| 4,365,674 | 12/1982 | Orthman | 172/574 |

FOREIGN PATENT DOCUMENTS

| | | | |
|---|---|---|---|
| 1018584 | 1/1953 | France | 111/88 |
| 1920055 | 4/1968 | France | 111/80 |
| 1460737 | 1/1977 | United Kingdom | 111/7 |

*Primary Examiner*—Robert E. Bagwill
*Assistant Examiner*—Danton DeMille
*Attorney, Agent, or Firm*—Zarley, McKee, Thomte, Voorhees & Sease

[57] ABSTRACT

A fertilizer dispensing disc assembly is adapted for direct attachment to a planter unit for vertical movement in unison so that fertilizer is dispensed at a uniform depth relative to the planted seeds. The ground opening coulters of the assembly are caster-mounted forwardly of the planter disc, thereby preventing interference with the steering of the planter implement.

12 Claims, 6 Drawing Figures

FERTILIZER DISC ASSEMBLY FOR A PLANTER

BACKGROUND OF THE INVENTION

The present invention is directed generally to a fertilizer dispensing disc assembly for a planter unit and more particularly to a fertilizer dispensing disc which is caster mounted directly to the planter unit for vertical movement therewith.

For efficient early growth of agricultural crops, it is advantageous to dispense fertilizer into the ground when planting. Tests have shown that fertilizer is most effective when placed in the soil approximately two inches to the side and two inches below the planted seeds. Accordingly, it is an object to provide an attachment for a planter implement which results in this most advantageous placement of the fertilizer relative to the planted seeds.

Several problems are encountered in adding fertilizer dispensing attachments to planter implements. First, the individual planter units are attached to the implement tool bar with freedom of vertical movement to accommodate uneven terrain and obstacles encountered by any individual planter unit. Accordingly, a fertilizer dispensing unit fixed to the planter tool bar is likely to experience vertical movement relative to the associated planter unit.

Secondly, the generally wide profile of the planter press wheels and associated structure does not afford room for placement of the fertilizer dispenser and associated ground opening means directly alongside the planter unit.

Thirdly, because planter units include one or more ground opening coulters and trash cutting discs, placement of the ground opening coulters for the fertilizer dispenser forwardly of the planter disc would impair turning of the implement. On turns, something would have to give. Either the soil would be pushed to the side, the discs would break or the supporting apparatus would bend. Likewise, two fixed discs arranged fore and aft of one another must be perfectly aligned to prevent the discs from having an effect on the steering of the implement.

Accordingly, a primary object of the invention is to provide an improved fertilizer disc assembly for a planter.

Another object is to provide a fertilizer disc assembly capable of placing fertilizer at a uniform depth relative to planted seeds.

Another object is to provide a fertilizer disc assembly including at least one ground opening disc placed in longitudinally spaced relation from the planter unit disc without impairing turning movement of the implement.

A more specific object of the invention is to provide a fertilizer disc assembly including a ground opening disc which is caster-mounted.

Another object of the invention is to provide a fertilizer disc assembly which may be quickly and easily added to existing planter implements.

A further object of the invention is to provide a fertilizer disc assembly which is simple and rugged in construction, economical to manufacture and efficient in operation.

SUMMARY OF THE INVENTION

The fertilizer disc assembly of the present invention includes an elongated frame adapted for securement to a planter unit for vertical movement in unison with it. A ground opening coulter is rotatably supported on a caster arm mounted with freedom of side-to-side pivotal movement. A fertilizer dispenser is connected to the coulter arm and has an open discharge end adjacent the bottom of the coulter for dispensing fertilizer into the ground opened by the coulter.

A pair of coulters may be provided in adjacent relation but inclined relative to one another so that the forward edges are situated in closely adjacent relation with the rearward edges spaced transversely apart for receiving the fertilizer dispenser therebetween. The frame is provided with stop means for limiting side-to-side pivotal movement of the caster arm and a top plate on the frame has an arcuate slot for accommodating side-to-side movement of the fertilizer dispenser with the caster-mounted coulter. A sleeve connector on the frame may be provided for receiving a U-shaped adapter for supporting conventional trash cutting discs forwardly of the planter unit.

Because the fertilizer dispensing coulters are caster-mounted, they do not impair turning movement of the implement and thereby prevent the substantial stress which would otherwise be imposed on the support structure for a fixed coulter situated forwardly of a planter unit. The direct mounting of the fertilizer disc assembly frame to the planter unit results in vertical movement in unison therewith for uniform fertilizer placement relative to the planted seeds.

DESCRIPTION OF THE PREFERRED EMBODIMENTS

Figure 1:
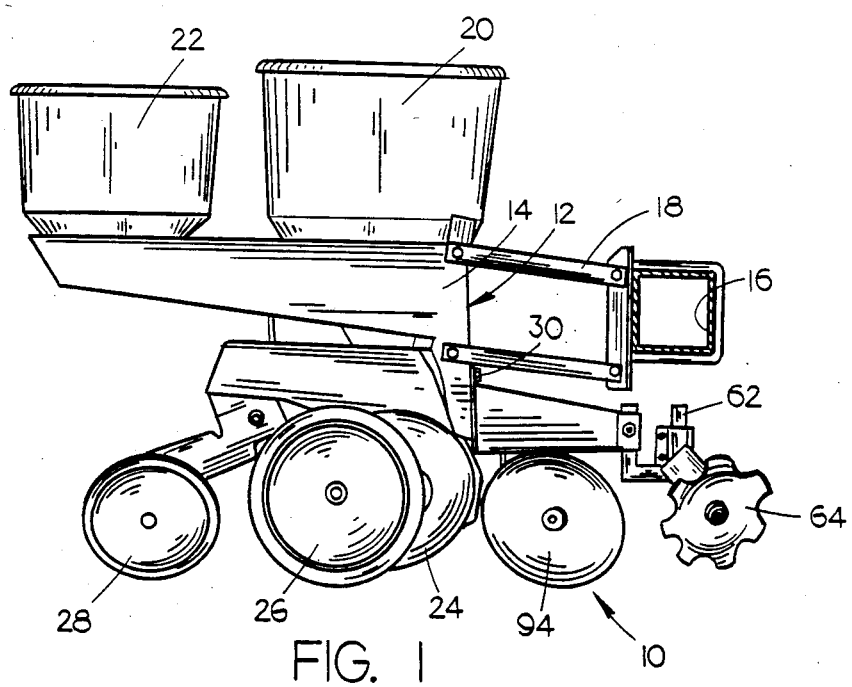
FIG. 1 is side elevational view of the fertilizer disc assembly installed on a planter unit mounted on an implement tool bar.

The fertilizer disc assembly 10 of the present invention is shown in FIG. 1 is assembly relation with an agricultural planter unit 12. A typical planter unit includes a main frame 14 mounted on an implement tool bar 16 by a parallelogram linkage 18 for at least limited freedom of vertical movement of the planter unit 12 relative to the tool bar 16. The main frame 14 supports the conventional seed and chemical hoppers 20 and 22 as well as the large planter disc 24, press wheel 26 and furrow closer 28. It is seen that the fertilizer disc assembly 10 is secured directly to the planter unit main frame 14 by bolts 30.

Figure 2:
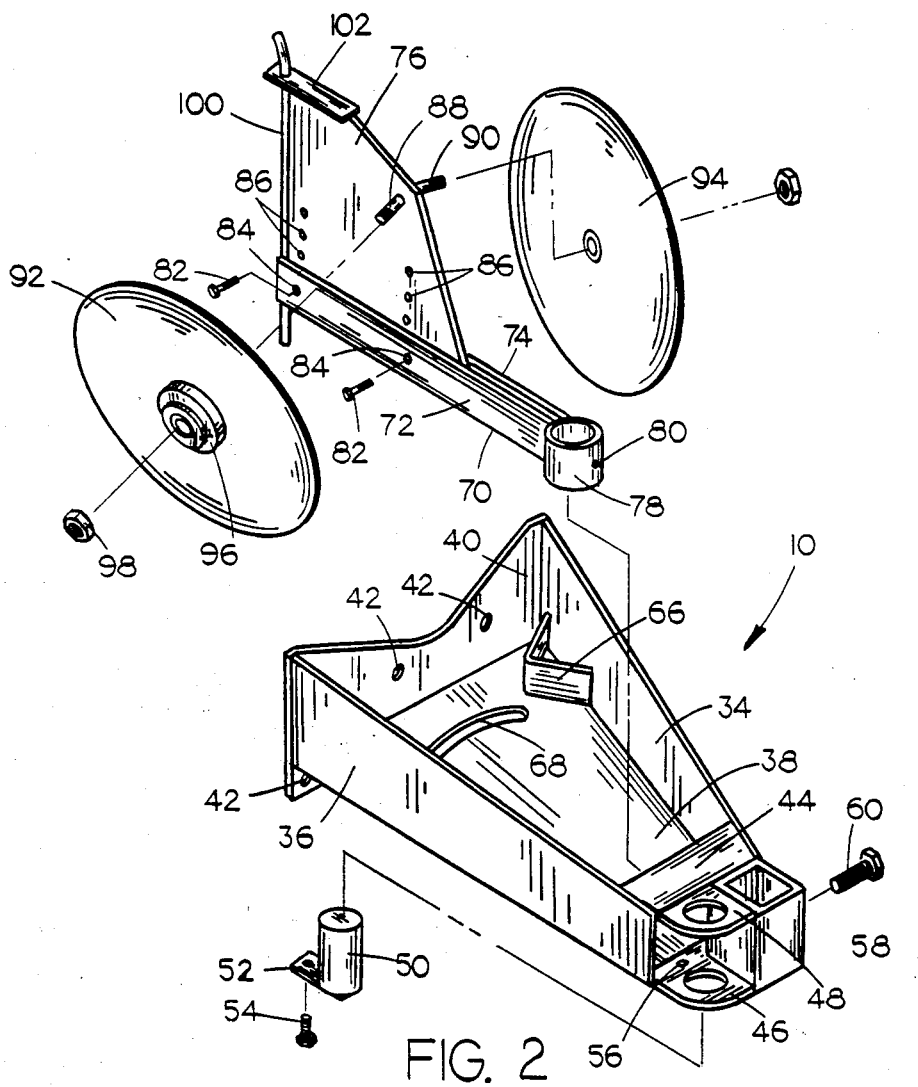
FIG. 2 is an enlarged inverted and exploded view of the fertilizer disc assembly of the invention.

The structure of the fertilizer disc assembly 10 is more clearly seen with the assembly turned upside down, as in FIG. 2. The assembly includes an elongated frame 32 having a pair of elongated transversely spaced-apart forwardly tapering side rails 34 and 36, a top plate 38 connected to and extending between the side rails and a rearward mounting plate 40. The mounting bolts 30 shown in FIG. 1 are insertable through mounting holes 42 in rear plate 40 and registered holes in the front surface of the planter unit main frame 14.

At the forward end of frame 32, a bottom gusset plate 44 cooperates with top plate 38 for supporting a pair of vertically spaced-apart caster pins support collars 46 and 48 having center openings for receiving caster pin 50 wich has a securement tab 52 and bolt 54 associated therewith for securement to top collar 46 through a registered hole 56.

Also welded to the front of frame 32 is a vertically disposed square section mounting sleeve 58 equipped with a side mounted set screw 60 for vertically adjusting the position of a generally U-shaped adapter 62 (FIG. 1) for adjustably supporting conventional trash cutting discs 64.

Interiorly of frame 32, a generally V-shaped stop member 66 is secured to side rail 34 for a purpose described below and an arcuate slot 68 is provided in top plate 38 to accommodate passage of a fertilizer delivery tube therethrough.

Also shown in FIG. 2 is the caster arm 70 which, in the preferred embodiment, comprises a pair of elongated plates 72 and 74 which are transversely spaced apart sufficiently for receiving a coulter-mounting standard 76 therebetween. Forward ends of plates 72 and 74 are secured to sleeve 78 which is adapted for insertion between collars 46 and 48 for receiving pin 50. Sleeve 78 may be provided with a conventional grease fitting 80.

Standard 76 is a generally flat plate, preferably formed of high strength steel having a tensile strength on the order of 120,000 psi. The standard 76 may be vertically adjustably secured to the caster arm plates 72 and 74 by bolts 82 insertable through registered holes 84 and 86.

Figure 4:
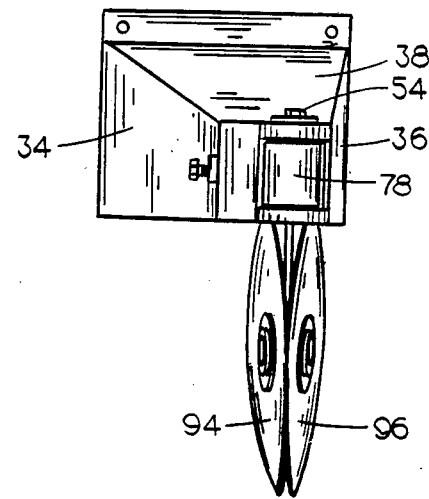
FIG. 4 is a front elevational view of the assembly.
Figure 5:
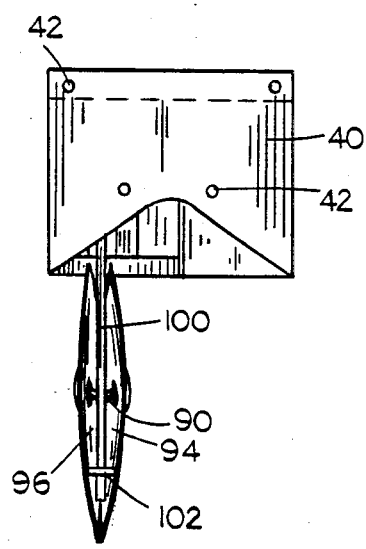
FIG. 5 is a rear elevational view of the assembly.

A lower forward portion of standard 76 has a pair of stub shafts 88 and 90 secured thereto and extended outwardly in inclined relation to one another for rotatably supporting a pair of coulters 92 and 94. The coulters are therefore likewise inclined relative to one another as shown best in FIGS. 4 and 6 such that the forward edges of the coulters are situated in closely adjacent relation whereas the rearward edges are spaced transversely further apart. Each coulter is mounted by a conventional bearing 96 and securement nut 98.

Figure 3:
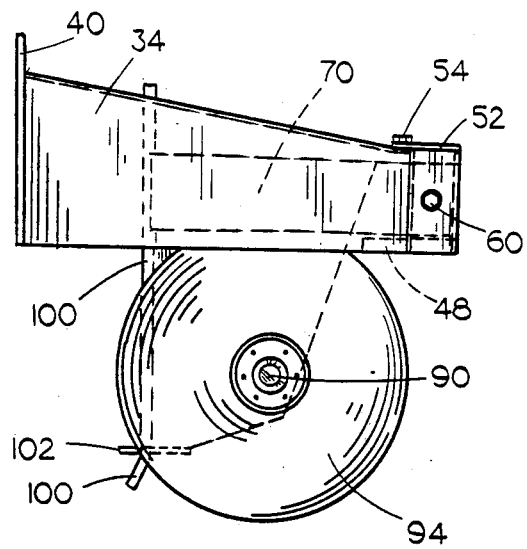
FIG. 3 is a side elevational view of the assembly with dotted lines indicating hidden structure thereof.
Figure 6:
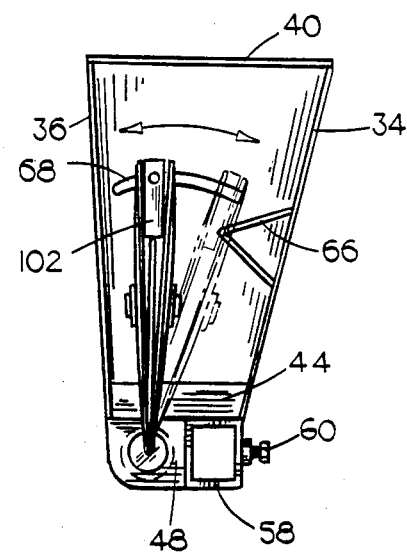
FIG. 6 is a bottom plan view of the assembly with dotted lines indicating the pivotal movement of the coulters thereof.

A fertilizer dispensing tube 100 is secured to the rearward edge of standard 76 to thereby extend downwardly between the spaced-apart rearward edges of the coulter, as shown in FIGS. 3 and 6. The dispensing tube 100 is preferably made of stainless steel and is further secured by passage through a hole in a generally horizontal scraper 102 secured to the lower edge of standard 76. The sides of the scraper are disposed in closely spaced parallel relation to the interior surfaces of the coulters for scraping dirt therefrom in response to rotation of the coulters. The fertilizer dispensing tube 100 extends upwardly through arcuate slot 68 in top plate 38 for connection to a source of anhydrous ammonia or whatever type of fertilizer is to be dispensed.

In operation, the fertilizer disc assembly is quickly and easily bolted to a conventional planter unit so that the coulters 92 and 94 are fixed relative to the seed dispensing apparatus of the planter unit. The trash cutting discs 64 are mounted on the U-shaped adapter 62 which is vertically adjustably connected to the frame 32 by set screw 60. Standard 76 can be vertically adjusted relative to caster arm 70 if necessary. Generally it is preferred that the standard be so adjusted that the coulters are positioned for dispensing fertilizer at a depth of two inches below seed placement. In very heavy soil, however, it may be difficult to get the coulters 92 and 94 in deep enough so it is preferable to adjust the coulters 92 and 94 upwardly relative to the caster arm rather than having the coulters raise the whole planter unit.

The planter implement can then be operated in conventional fashion with no impairment to the steering thereof due to the fertilizer disc assemblies of the present invention. Whereas the center of the discs 92 and 94 may be situated approximately 16 inches forwardly of the planter disc 24, the castering action afforded by arm 70 eliminates the stresses which would otherwise be imposed on the coulter supporting structure. During turning movements, the fertilizer dispensing tube 100 freely moves from side-to-side within slot 68. Furthermore, the side rail 36 and stop member 66 are so positioned relative to the ends of the slot 68 that abutment of the caster arm 70 with side rail 36 and stop member 66 is operative to prevent abutment of the fertilizer dispensing tube 100 with the ends of the slot 68.

Whereas a preferred embodiment of the invention has been shown and described herein, it is apparent that many additions, substitutions and modifications may be made thereto which are within the intended broad scope of the invention. For example, means may be provided for transverse adjustment of the coulters. Likewise, a pair of coulter arms could be provided on a single frame for dispensing fertilizer on both sides of a row of seeds. The provision of double coulters is preferred, but not critical. Whereas the mounting plate 40 which is illustrated is readily adapted for direct connection to a John Deere planter unit, among others, the mounting means can be easily modified for securement to other known planter units.

Thus there has been shown and described a fertilizer disc assembly which accomplishes at least all of the stated objects.

We claim:

1. A fertilizer disc assembly mounted forwardly of an agricultural planter unit, said planter unit is adapted to be mounted on an implement tool bar with freedom of vertical movement relative to the tool bar and including a seed dispensing means and a ground opening disc rotatably supported forwardly of the seed dispensing means, the fertilizer disc assembly including,
   an elongated frame,
   means securing said frame forwardly of said planter unit for vertical movement therewith,
   a caster arm having forward and rearward ends,
   means connecting the forward end of the caster arm to said frame for free side-to-side pivotal movement of the rearward end thereof,
   at least one coulter,
   means operatively supporting said coulter on said rearward end of said caster arm for rotation about a generally transverse axis, and
   a fertilizer dispenser operatively connected to said coulter arm and having an open discharge end adjacent the bottom of the coulter for dispensing fertilizer into ground opened by the coulter.

2. The fertilizer disc assembly of claim 1 further comprising a second coulter and means for operatively supporting said second coulter on said caster arm in adjacent relation to said one coulter.

3. The fertilizer disc assembly of claim 2 wherein the axes of rotation of the coulters are inclined relative to one another such that the forward edges of the coulters are situated in closely adjacent relation with the rearward edges being spaced transversely further apart.

4. The fertilizer disc assembly of claim 3 wherein said fertilizer dispenser comprises a fertilizer dispensing tube which extends downwardly between the spaced-apart rearward edges of said coulters.

5. The fertilizer disc assembly of claim 4 wherein said elongated frame includes stop means engageable by said caster arm for limiting side-to-side pivotal movement thereof in opposite directions.

6. The fertilizer disc assembly of claim 5 wherein said elongated frame includes a pair of elongated transversely spaced-apart side rails, a generally flat plate connected to and extended between the side rails, said plate including a generally transversely extended arcuate slot to accommodate passage of the fertilizer dispensing tube therethrough.

7. The fertilizer disc assembly of claim 6 wherein said slot is so positioned relative to said stop means that abutment of said coulter arm with said stop means is operative to prevent abutment of the fertilizer dispensing tube with the ends of said slot.

8. The fertilizer disc assembly of claim 7 further comprising a scraper member on said coulter arm and so positioned for operatively scraping dirt and the like from interior surfaces of said coulters adjacent rearward edges thereof in response to rotation of the coulters.

9. The fertilizer disc assembly of claim 8 wherein said scraper has a vertical opening therethrough, said fertilizer dispensing tube extending downwardly through said opening.

10. The fertilizer disc assembly of claims 1 or 9 further comprising means for vertically adjusting the position of the coulter relative to said elongated frame.

11. A fertilizer disc assembly mounted forwardly of an agricultural planter unit, said planter unit is adapted to be mounted on an implement tool bar with freedom of vertical movement relative to the tool bar and including a seed dispensing means and a ground opening disc rotatably supported forwardly of the seed dispensing means, the fertilizer disc assembly including, an elongated frame, means securing said frame forwardly of said planter unit for vertical movement therewith, a caster arm having forward and rearward ends, means connecting the forward end of the caster arm to said frame for free side-to-side pivotal movement of the rearward end thereof, means operatively supporting at least one coulter on said rearward end of said caster arm for rotation about a generally transverse axis, and a fertilizer dispenser operatively connected to said coulter arm and having an open discharge end adjacent the bottom of the coulter for dispensing fertilizer into ground opened by the coulter.

12. In combination, an agricultural planter unit adapted to be mounted on an implement tool bar with freedom of vertical movement relative to the tool bar and including a seed dispensing means and a ground opening disc rotatably supported forwardly of said seed dispensing means, a fertilizer disc assembly, including an elongated frame, means securing said frame to the planter unit such that said frame extends at least partially forwardly of said ground opening disc for vertical movement in unison with the planter unit, a caster arm having forward and rearward ends, means connecting the forward end of the caster arm to said frame for side-to-side pivotal movement of the rearward end thereof, at least one coulter, means operatively supporting said coulter on said rearward end of said caster arm for rotation about a generally transverse axis, said coulter being positioned forwardly of said ground opening disc, and a fertilizer dispensing tube attached to said coulter arm and having an open discharge end adjacent the bottom of said coulter for dispensing fertilizer into the ground opened by said coulter.

* * * * *